United States Patent

Stark-Kasley et al.

[11] Patent Number: 5,300,327
[45] Date of Patent: Apr. 5, 1994

[54] WATER REPELLENT ORGANOSILICON COMPOSITIONS

[75] Inventors: Lori A. Stark-Kasley; Donna R. Gray, both of Midland; James S. Tonge, Sanford; Dipak Narula, Midland, all of Mich.

[73] Assignee: Dow Corning Corporation, Midland, Mich.

[21] Appl. No.: 35,025

[22] Filed: Mar. 22, 1993

[51] Int. Cl.$^5$ .............................................. B05D 3/02
[52] U.S. Cl. ........................................ 427/387; 106/2; 106/10; 427/393.4.393.6; 428/447; 428/452; 428/540
[58] Field of Search ...................... 106/2, 10; 427/387, 427/389.9, 393.4, 393.6; 428/447, 452, 540

[56] References Cited

U.S. PATENT DOCUMENTS

| | | |
|---|---|---|
| 4,221,688 | 9/1980 | Johnson et al. ............... 525/119 X |
| 4,273,813 | 6/1981 | Meddaugh ......................... 427/387 |
| 5,073,195 | 12/1991 | Cuthbert et al. .................... 106/2 |
| 5,154,759 | 10/1992 | Cifuentas et al. ............. 106/10 X |
| 5,205,860 | 4/1993 | Narula et al. ...................... 106/2 |
| 5,226,954 | 7/1993 | Suzuki .................................. 106/2 |

Primary Examiner—Michael Lusignan
Attorney, Agent, or Firm—James L. DeCesare

[57] ABSTRACT

A composition in the form of an aqueous solution made by combining (i) an alkyltrialkoxysilane with $C_1$ to $C_{10}$ alkyl groups on silicon; (ii) a silane coupling agent which is an amino organofunctional trialkoxysilane or a quaternary ammonium organofunctional trialkoxysilane; (iii) a blend of petroleum and synthetic hydrocarbon waxes; and (iv) an aqueous silicone resin emulsion. The composition is used in the treatment of cellulosic and masonry surfaces to render the surface water repellent.

16 Claims, No Drawings

WATER REPELLENT ORGANOSILICON COMPOSITIONS

BACKGROUND OF THE INVENTION

This invention is directed to the treatment of cellulosic and masonry surfaces, and more particularly to the use of certain organosilicon compounds and combinations thereof, in order to render such surfaces water repellent.

In U.S. Pat. No. 5,073,195, issued Dec. 17, 1991, there is disclosed an aqueous solution formed by combining water, a silane coupling agent, and an alkyltrialkoxysilane. The solution is used as a treating agent for cellulosic and masonry surfaces for rendering such surfaces water repellent. The present invention is an improvement on the '195 patent, in which these type of aqueous solutions have been found to exhibit better water exclusion when combined with certain waxes. Thus, the addition of a wax to an aqueous treating solution of the type described in the '195 patent, has been found to result in better water repellency properties, than can be obtained with either the aqueous treating solution alone or with the wax alone.

In a prior copending U.S. patent application Ser. No. 07/839,419, filed Feb. 21, 1992, now abandoned, entitled "Method of Producing Aqueous Silicone Resin Emulsions", and assigned to the same assignee as the present application, there is described certain emulsified silicone resins. It has been found that these emulsified silicone resins can be combined with the aqueous treating solution and the wax noted above, to provide improved even better water exclusion and repellency, than can be obtained with either the aqueous treating solution of the '195 patent alone, with the wax alone, or with the emulsified silicone resin of the '419 application alone.

With the advent of various federal and state environmental constraints on volatile organic content, these water based systems have significant advantage and value in the market place, especially in construction and architectural applications.

SUMMARY OF THE INVENTION

The invention relates to compositions and methods of treating cellulosic and masonry surfaces with aqueous solutions formed by combining one or more alkyltrialkoxysilanes, an amine or quaternary ammonium functional silane coupling agent, an aqueous silicone resin emulsion, wax blends of petroleum and synthetic hydrocarbon waxes; and mixtures thereof. When applied to such surfaces, these compositions exhibit water beading, water exclusion, and water repellency characteristics.

The invention is also directed to aqueous based compositions for construction and architectural applications which comply with the various state and federal regulations limiting volatile organic content.

These and other features, objects, and advantages, of the herein defined present invention will become more apparent when considered in light of the following detailed description thereof.

DETAILED DESCRIPTION OF THE INVENTION

A composition according to the present invention is in the form of an aqueous solution made by combining water and (i) and alkyltrialkoxysilane with $C_1$ to $C_{10}$ alkyl groups on silicon, or a blend of alkyltrialkoxysilanes each with $C_1$ to $C_{10}$ alkyl groups on silicon; (ii) a silane coupling agent having the formula $RSi(OR')_3$ in which R' is an alkyl group of one to six carbon atoms, and R is a reactive organofunctional group which is an amino or a quaternary ammonium organofunctional group; and (iii) a blend of petroleum and synthetic hydrocarbon waxes.

Where the alkyltrialkoxysilane is reacted with a silane coupling agent containing a reactive amino group, the reaction product may then be cold blended with another silane coupling agent having either an amino or quaternary ammonium reactive organofunctional group, if desired. Similarly, where the alkyltrialkoxysilane is reacted with a silane coupling agent containing a reactive quaternary ammonium group, the reaction product may then be cold blended with another silane coupling agent having either an amino or quaternary ammonium reactive organofunctional group.

Suitable alkyltrialkoxysilanes are compounds such as methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, butyltriethoxysilane, and hexyltrimethoxysilane.

Suitable silane coupling agents with amino organofunctionality are compounds such as N-(2-aminoethyl)-3-aminopropyltrimethoxysilane, N-(aminoethylaminomethyl)phenyltrimethoxysilane, N-(2-aminoethyl)-3-aminopropyltris(2-ethylhexoxy)silane, 3-aminopropyltrimethoxysilane, trimethoxysilylpropyldiethylenetriamine, and bis(2-hydroxyethyl)-3-aminopropyltrimethoxysilane.

Suitable silane coupling agents with quaternary ammonium organofunctionality are compounds such as 2-methacryloxyethyldimethyl(3-trimethoxysilylpropyl) ammonium chloride, and 2-hydroxyethyldimethyl(3-trimethoxysilylpropyl) ammonium chloride.

The aqueous solution should include from one to twenty percent by weight of the combination of the alkyltrialkoxysilane and the silane coupling agent, in which the alkyltrialkoxysilane and the silane coupling agent are present in the mole ratio of 0.5:1 to 3:1; from two to fifteen percent by weight of the wax blend; and the balance being water.

In a second embodiment of the present invention, both cellulosic and masonry surfaces are treated with a water repellent composition which is in the form of a mixture of (i) a blend of petroleum and synthetic hydrocarbon waxes; and (ii) an aqueous silicon resin emulsion prepared by (A) hydrolyzing at least one organochlorosilane in the presence of an organic solvent to form a silicone resin hydrolyzate solution whereby said silicone resin hydrolyzate has a residual hydrolyzable chloride content of fifteen to one hundred parts per million by weight, (B) stripping said hydrolyzate solution to reduce the organic solvent content thereof, and (C) emulsifying the solution resulting from step (B) in water with the aid of at least one anionic surfactant to form a uniform emulsion, with the proviso that the solvent content reduction according to step (B) provides an emulsion which forms a continuous film when applied to a substrate and dried thereon.

In this second embodiment, the silicone hydrolyzate includes at least two units such as $MeSiO_{3/2}$ units, $Me_2SiO_{2/2}$ units, $PhMeSiO_{2/2}$ units, $PhSiO_{3/2}$ units, $Ph_2SiO_{2/2}$ units, and $PrSiO_{3/2}$ units; in which Me is methyl, Ph is phenyl, Pr is propyl; and in which the silicone has a hydroxyl group content of 0.5-6.0 weight percent. The composition according to this second embodiment of the invention should include from two to twenty percent by weight of the silicone resin; from two to fifteen percent by weight of the wax blend; and the balance being water.

The aqueous silicone resin emulsion according to this alternate form of the invention, and the specific details of making the emulsion, are described in a prior copending U.S. patent application Ser. No. 07/839,419, filed Feb. 21, 1992, entitled "Method of Producing Aqueous Silicone Resin Emulsions". The prior application is assigned to the same assignee as the present application, and which the prior application is incorporated herein by reference thereto.

In yet a third embodiment of the present invention, a water repellent composition is provided in the form of an aqueous solution made by combining (i) an alkyltrialkoxysilane as described above; (ii) a silane coupling agent as described above; (iii) a blend of petroleum and synthetic hydrocarbon waxes; and (iv) the aqueous silicone resin emulsion as described above. The aqueous solution in this third embodiment should include from one to ten percent by weight of the combination of the alkyltrialkoxysilane and the silane coupling agent, in which the alkyltrialkoxysilane and the silane coupling agent are present in the mole ratio of 0.5:1 to 3:1; two to twenty percent by weight of the wax blend; two to ten percent by weight of the silicone resin; the balance being water.

In any of the foregoing embodiments, the wax is preferably a blend of petroleum and synthetic waxes, more particularly a blend which includes both paraffin and polyethylene waxes. The polyethylene waxes can be high or low density polyethylene waxes, or mixtures of high and low density polyethylene waxes. An exemplary wax and a wax found to be especially suitable in accordance with the present invention, is JON-WAX®120, a product and a trademark of S.C. Johnson & Sons Inc. of Racine, Wis. USA. This wax is sold in the form of a wax emulsion of polyethylene and paraffin waxes with a solids content of about thirty-five percent. Other blended paraffin and polyethylene type waxes can also be employed.

The utility of the foregoing compositions as water repellents for cellulosic and masonry surfaces was confirmed by a water exclusion test method. The water exclusion test method for wood was a gravimetric method. The water exclusion test method for grout and sandstone was a test method which was conducted in accordance with Federal Specification SS-W-110C. A water repellency test for wood was also used, and this test was conducted in accordance with Federal Specification TT-W-572B.

In the gravimetric method for wood, standard 2"×4" pine, redwood, and cedar, boards were cut into six inch lengths and allowed to equilibrate in a fifty percent relative humidity atmosphere. The boards were treated with the water repellent composition by either brushing until soaked and saturated with the composition, or by soaking the boards in the composition for three minutes. An untreated control board was kept in a fifty percent humidity room during the cure process. The treated boards were left to cure for one day in a laboratory, and placed in the fifty percent humidity room for six days to completely cure and become equilibrated. After cure, the boards including the control board were weighed and placed in room temperature water for fifteen minutes, and turned over and left in the water for an additional fifteen minutes. All of the boards were weighed and the water uptake was calculated. The percent water exclusion was computed as the water uptake of the control board minus the water uptake of the treated board, multiplied by one hundred, and divided by the water uptake of the control board.

In a variation, the above testing was continued by allowing the boards to equilibrate at fifty percent humidity for an additional week. The thirty minute soak was again repeated, and water exclusion again calculated. In a further variation, testing was continued by allowing the boards to equilibrate at fifty percent humidity for yet a third week. The thirty minute soak was repeated for the third time, and a third value for water exclusion calculated.

The Federal Test Method SS-W-110C was used to obtain the percent water absorption of pieces of grout and sandstone. Grout cubes were 2"×2"2" cubes made from mortar and sand. Sandstone was 1"×1"×4" Briar Hill Sandstone pieces. Untreated control pieces were included for comparison and in order to arrive at a value for water exclusion. The grout and sandstone pieces were wire brushed and blown clean with high pressure air. The pieces were weighed and dried in an oven at eighty degrees Centigrade until a constant weight was achieved. The pieces were weighed, placed in one-quarter inch of water for twenty-four hours, weighed, and dried until a constant weight was achieved. The pieces were treated with the water repellent composition by soaking for ten seconds. The pieces were weighed before and after treatment with the water repellent composition. The pieces were allowed to cure for forty-eight hours and returned to the water to soak for seventy-two hours. The pieces were weighed, and water uptake, percent water absorption, and percent water exclusion, were calculated. Percent water absorption was computed as water uptake multiplied by one hundred, divided by the weight of the dry piece.

The water repellency "Swellometer" Test for wood, according to Federal Specification TT-W572B, included the use of wafers cut from straight grained, clear, average density, flat grained, kiln dried, ponderosa pine sapwood. The wood was machined to 1.5" by 10" and wafers were cut having a thickness of one-quarter inch. All wood pieces were conditioned at fifty percent relative humidity and seventy degrees Fahrenheit until a constant weight was reached. An untreated piece was used as a control for each treated piece and taken from consecutive pieces of the board. Treated pieces were soaked for three minutes in the water based repellent compositions of the present invention. For comparison purposes, a soak of thirty seconds was used for a leading commercial solvent based composition. The pieces were air dried under ambient conditions for one day and returned to the conditioning room for six days. When a constant weight had been reached, the pieces were tested for swell in a Swellometer of specifications in accordance with standards prescribed by the American Society for Testing and Materials, Philadelphia, Pa., ASTM 4446-84. Both treated and untreated pieces were each placed in a Swellometer. The Swellometers were placed in deionized water for thirty minutes. The swell of each piece of wood was recorded at intervals of one, three, five, fifteen, and thirty, minute intervals. The percent water repellency was calculated as swell of the control minus swell of the treated piece, multiplied by one hundred, and divided by swell of the control.

In a variation, the above testing was continued by allowing the boards to equilibrate at fifty percent humidity for an additional week. The thirty minute soak was again repeated, and water repellency again calculated. In a further variation, testing was continued by allowing the boards to equilibrate at fifty percent humidity for yet a third week. The thirty minute soak was repeated for the third time, and a third value for water repellency calculated.

The following examples are set forth for the purpose of illustrating the invention in more detail. In the examples and in the tables which follow, percentages represent the amount of the active ingredient in weight percent which is present in the water based composition. The abbreviation "MTMS/AFS" represents a combination of the alkyltrialkoxysilane methyltrimethoxysilane, and the amino organofunctional silane coupling agent N(2-aminoethyl)-3-aminopropyltrimethoxysilane, in a mole ratio of 1.5:1. The silicone resin is identified as "Silicone Resin". The wax component is JONWAX®120, a product and a trademark of S.C. Johnson & Sons Inc. of Racine, Wis. USA.

EXAMPLE I

JONWAX®120 at a solids content of five percent by weight in water, was blended with water solutions formed by combining 2.5 percent by weight of MTMS/AFS; and 2.5 and 7.5 percent by weight of the Silicone Resin in water. For purposes of comparison, the wax was evaluated alone at a concentration of five percent by weight in water. A leading commercial solvent based organic water repellent "Thompson's Water Seal", was also employed for purposes of comparison. The various solutions were tested for gravimetric water exclusion and Swellometer water repellency on wood, in accordance with the procedures outlined above. The results of these tests are set forth in the tables which follow.

TABLE I

SWELLOMETER TEST FOR WATER REPELLENCY

| Treating Agent | Time in Minutes | | | | | % WE |
|---|---|---|---|---|---|---|
| | 1.0 | 3.0 | 5.0 | 15.0 | 30.0 | |
| 2.5% MTMS/AFS Alone | 43.7 | — | — | — | −4.7 | 15.4 |
| 2.5% MTMS/AFS w/Wax | 96.5 | 91.2 | 84.3 | 57.7 | 40.4 | 67.6 |
| 2.5% Silicone Resin Alone | 92.6 | 71.9 | 52.5 | 19.7 | 14.2 | 41.1 |
| 2.5% Silicone Resin w/WAX | 93.7 | 85.5 | 78.1 | 44.4 | 12.4 | 63.6 |
| 7.5% Silicone Resin w/WAX | 96.9 | 92.9 | 88.6 | 64.2 | 39.8 | 73.1 |
| 5% JONWAX ® 120 Alone | 81.3 | 59.1 | 38.5 | −8.0 | −25.2 | 36.8 |
| Thompson's Water Seal | 97.4 | 95.5 | 93.3 | 82.2 | 66.3 | 78.8 |
| Thompson's Water Seal | 94.0 | — | — | 64.0 | 46.0 | 76.8 |

In Table I, the percent water exclusion (%WE) is based on the weight gain of treated and untreated Swellometer boards after thirty minute soaks.

It should be apparent from Table I that the compositions in accordance with the present invention are comparable to the leading "solvent" based commercial product, and possess the advantage of being water based, and hence in compliance with the VOC standards currently prescribed by the Federal and state authorities. In addition, Table I exhibits what can be considered a "synergism", to the extent that the aqueous solutions including the WAX and the organosilicon compounds were more effective than solutions containing only the WAX and only the organosilicon compounds.

Gravimetric testing of these compositions on 2"×4" boards is shown below in Table II, in which six inch 3≧×4" boards were treated, and cured for one week. In Test I, the boards were soaked for thirty minutes and dried for one week. In Test II, the boards were again soaked for thirty minutes and dried for another week. In Test III, the boards were soaked a third time for thirty minutes and dried for one more week.

TABLE II

GRAVIMETRIC TESTING

| | Percent Water Exclusion | | |
|---|---|---|---|
| Treating Agent | Test No. I | Test No. II | Test No. III |
| 2.5% MTMS/AFS Alone | 65.1 | — | — |
| 2.5% MTMS/AFS w/Wax | 81.9 | 84.8 | 85.4 |
| 7.5% Silicone Resin Alone | 62.5 | 60.0 | 59.4 |
| 2.5% Silicone Resin w/WAX | 88.5 | 84.1 | 77.8 |
| 5% JONWAX ® 120 Alone | 82.0 | 74.2 | 66.6 |
| Thompson's Water Seal | 75.3 | — | — |

In Table II, the compositions in accordance with the present invention are shown to be comparable with the leading "solvent" based commercial product. It is also significant to note that one of the compositions of the present invention which is shown in Table II as treating agent "2.5% MTMS/AFS w/WAX", actually increased the water exclusion in the repetitive Test Nos. II and III. Thus, the percent water exclusion increased from an initial value of 81.9 percent to a value of 85.4 percent.

In Table III, the results of masonry testing of these compositions using sandstone and mortar cubes is shown, in which the test procedure employed conformed to the Federal Specifications SS-W-110C outline in detail above.

TABLE III

MASONRY TESTING

| | Percent Water Exclusion | |
|---|---|---|
| Treating Agent | Sandstone | Mortar Cubes |
| 2.5% MTMS/AFS Alone | 89.0 | 8.0 |
| 2.5% MTMS/AFS w/Wax | 37.5 | 45.5 |
| 2.5% Silicone Resin w/WAX | 0.6 | 6.9 |
| 5% JONWAX ® 120 Alone | 5.8 | −12.2 |

In Table III, the treating agent "2.5% MTMS/AFS w/WAX" is shown to exhibit the best performance on mortar cubes of any of the treating agents tested.

EXAMPLE II

A three component water repellent composition according to the invention was prepared by combining (i) JONWAX® 120 at a solids content of five percent in water blended with (ii) 2.5 percent by weight of MTMS/AFS, and (iii) 7.5 percent by weight of the Silicone Resin. This solution was tested for gravimetric water exclusion and Swellometer water repellency on wood, in accordance with the procedures outline above.

The results of the Swellometer testes yielded percent water repellency values of 94.0 at the end of one minute; 89.0 at the end of three minutes; 84.7 at the end of five minutes; 66.9 at the end of fifteen minutes; and 48.4 at the end of thirty minutes. The percent water exclusion was 76.4.

Gravimetric testing on 2"×4" boards yield percent water exclusion values of 88.8 for Test No. I; 80.1 for Test No. II; and 78.5 for Test No. III.

These values are comparable to the solvent based water repellent of Tables I and II. In addition, the three component water based composition prepared in Example II was found to have a volatile organic content of less than one hundred grams per liter, which is in compliance with state and Federal VOC regulations, and a distinct advantage over commercial solvent based formulations.

EXAMPLE III

Example II was repeated, and several three component water repellent composition according to the invention were prepared by combining (i) varying levels of JONWAX® 120 at a solids content of from about two to about twenty percent, with (ii) varying levels of MTMS/AFS ranging from one to ten percent, and (iii) varying levels of the Silicone Resin ranging from two to ten percent.

These solutions were tested for gravimetric water exclusion and Swellometer water repellency on wood, in accordance with the procedures outline above. The formulation yielding the best results in Swellometer testing was a composition containing twenty percent JONWAX® 120, 4.62 percent MTMS/AFS, and 2.5 percent Silicone Resin. Results for that composition are set forth in Tables IV and V. Two samples of that composition were compared to two Lots of Thompson's Water Seal. Water repellency values were as high as 98.6 at the end of one minute; 96.4 at the end of three minutes; 94.1 at the end of five minutes; 80.0 at the end of fifteen minutes; and 61.9 at the end of thirty minutes. The highest value for percent water exclusion was found to be 72.2.

TABLE IV

| SWELLOMETER TEST FOR WATER REPELLENCY | | | | | | |
|---|---|---|---|---|---|---|
| | Time in Minutes | | | | | |
| Treating Agent | 1.0 | 3.0 | 5.0 | 15.0 | 30.0 | % WE |
| Sample I, Test I | 97.0 | 93.6 | 90.5 | 69.6 | 44.2 | 63.2 |
| Sample I, Test II | 98.3 | 96.4 | 94.1 | 80.0 | 61.9 | 72.2 |
| Sample I, Test III | 98.6 | 96.1 | 93.3 | 78.2 | 60.9 | 72.0 |
| Sample II, Test I | 96.8 | 93.9 | 89.9 | 69.4 | 44.9 | 64.6 |
| Sample II, Test II | 98.3 | 96.1 | 93.3 | 77.3 | 57.4 | 69.3 |
| Sample II, Test III | 98.4 | 95.1 | 91.2 | 73.0 | 54.8 | 70.2 |
| Thompson's Water Seal - Lot I | 97.4 | 95.5 | 93.3 | 82.2 | 66.3 | 78.8 |
| Thompson's Water Seal - Lot II | 94.0 | — | — | 64.0 | 46.0 | 76.8 |

TABLE V

| GRAVIMETRIC TESTING | | | |
|---|---|---|---|
| | Percent Water Exclusion | | |
| Treating Agent | Test I | Test II | Test III |
| Sample I | 52.3 | 74.2 | 79.8 |
| Sample II | 48.7 | 67.4 | 77.0 |
| Thompson's Water Seal - Lot I | 75.3 | — | — |

EXAMPLE IV

Wood samples were treated with the formulation of Example III containing twenty percent JONWAX® 120, 4.62 percent MTMS/AFS, and 2.5 percent Silicone Resin. Wood samples were also treated with Thompson's Water Seal for purposes of comparison. The samples were tested for surface beading after exposure in a Xenon Arc Weatherometer. As shown in Table IV, the formulation of the present invention provided an increase in surface beading of sixty-four percent over that of the comparitive product.

TABLE VI

| Formulation | Total Hours At Failure | Light Hours At Failure |
|---|---|---|
| 4.62% MTMS/AFS, 2.5% Silicone Resin, 20% Wax | 1500 | 1000 |
| Thompson's Water Seal | 920 | 610 |

The compositions according to the present invention may be applied commercially to cellulosic and masonry surfaces by brushing, pouring, spraying, roller coating, dipping, or doctor blading techniques. The compositions may be applied in amounts sufficient to thoroughly coat the surface to be treated, and yet not excess amounts so as to waste the product.

Other variations and modifications may be made in the compounds, compositions, and methods, described herein without departing from the essential features and concepts of the present invention. The forms of the invention described herein are exemplary only, and are not intended as limitations on the scope of the invention as defined in the appended claims.

That which is claimed is:

1. A method of treating a surface in order to render the surface water repellent comprising applying to the surface a composition in the form of effective film forming amounts of a mixture of (i) a blend of petroleum and synthetic hydrocarbon waxes; and (ii) an aqueous silicone resin emulsion prepared by (A) hydrolyzing at least one organochlorosilane in the presence of an organic solvent to form a silicone resin hydrolyzate solution whereby said silicone resin hydrolyzate has a residual hydrolyzable chloride content of fifteen to one hundred parts per million by weight, (B) stripping said hydrolyzate solution to reduce the organic solvent content thereof, and (C) emulsifying the solution resulting from step (B) in water with the aid of at least one anionic surfactant to form a uniform emulsion, with the proviso that the solvent content reduction according to step (B) provides an emulsion which will form a continuous film when applied to a substrate and dried thereon.

2. A method according to claim 1 wherein the silicone hydrolyzate comprises at least two units selected from the group consisting of $MeSiO_{3/2}$ units, $Me_2SiO_{2/2}$ units, $PhMeSiO_{2/2}$ units, $PhSiO_{3/2}$ units, $Ph_2Si$-

$O_{2/2}$ units, and $PrSiO_{3/2}$ units and wherein Me is methyl, Ph is phenyl, Pr is propyl, and in which the silicone has a hydroxyl group content of 0.5–6.0 weight percent.

3. A method according to claim 1 in which the surface is cellulosic.

4. A method according to claim 1 in which the surface is masonry.

5. A method according to claim 1 in which the blend includes paraffin and polyethylene waxes.

6. A method according to claim 1 in which the composition includes from two to twenty percent by weight of silicone resin, and from two to fifteen percent by weight of the wax blend.

7. A composition comprising an aqueous solution made by combining effective film-forming amounts of (i) an alkyltrialkoxysilane selected from the group consisting of alkyltrialkoxysilanes with $C_1$ to $C_{10}$ alkyl groups on silicon, and a blend of alkyltrialkoxysilanes each with $C_1$ to $C_{10}$ alkyl groups on silicon; (ii) a silane coupling agent having the formula $RSi(OR')_3$ in which R' is an alkyl group of one to six carbon atoms, and R is a reactive organofunctional group selected from the group consisting of amino and quaternary ammonium organofunctional group; (iii) a blend of petroleum and synthetic hydrocarbon waxes; and (iv) an aqueous silicone resin emulsion prepared by (A) hydrolyzing at least one organochlorosilane in the presence of an organic solvent to form a silicone resin hydrolyzate solution whereby said silicone resin hydrolyzate has a residual hydrolyzable chloride content of fifteen to one hundred parts per million by weight, (B) stripping said hydrolyzate solution to reduce the organic solvent content thereof, and (C) emulsifying the solution resulting from step (B) in water with the aid of at least one anionic surfactant to form a uniform emulsion, with the proviso that the solvent content reduction according to step (B) provides an emulsion which forms a continuous film when applied to a substrate and dried thereon.

8. A composition according to claim 7 wherein the silicone hydrolyzate comprises at least two units selected from the group consisting of $MeSiO_{3/2}$ units, $Me_2SiO_{2/2}$ units, $PhMeSiO_{2/2}$ units, $PhSiO_{3/2}$ units, $Ph_2SiO_{2/2}$ units, and $PrSiO_{3/2}$ units and wherein Me is methyl, Ph is phenyl, Pr is propyl, and in which the silicone has a hydroxyl group content of 0.5–6.0 weight percent.

9. A composition according to claim 7 in which the alkyltrialkoxysilane is a compound selected from the group consisting of methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, butyltriethoxysilane, and hexyltrimethoxysilane.

10. A composition according to claim 7 in which the silane coupling agent is a compound selected from the group consisting of N-(2-aminoethyl)-3-aminopropyltrimethoxysilane, N-(aminoethylaminomethyl)phenyltrimethoxysilane, N-(2-aminoethyl)-3-aminopropyltris(2-ethylhexoxy)silane, 3-aminopropyltrimethoxysilane, trimethoxysilylpropyldiethylenetriamine, and bis(2-hydroxyethyl)-3-aminopropyltrimethoxysilane.

11. A composition according to claim 7 in which the silane coupling agent is a compound selected from the group consisting of 2-methacryloxyethyldimethyl(3-trimethoxysilylpropyl) ammonium chloride, and 2-hydroxyethyldimethyl(3-trimethoxysilylpropyl) ammonium chloride.

12. A composition according to claim 7 in which the blend includes paraffin and polyethylene waxes.

13. A composition according to claim 7 in which the aqueous solution includes a total of from one to ten percent by weight of alkyltrialkoxysilane and silane coupling agent, in which alkyltrialkoxysilane and the silane coupling agent are present in the mole ratio of 0.5:1 to 3:1; two to twenty percent by weight of the wax blend; and two to ten percent by weight of the silicone resin.

14. A method of treating a surface in order to render the surface water repellent comprising applying to the surface a composition as defined in claim 7.

15. A method according to claim 14 in which the surface is cellulosic.

16. A method according to claim 14 in which the surface is masonry.

* * * * *